(12) United States Patent
Lacroix et al.

(10) Patent No.: US 10,875,519 B2
(45) Date of Patent: Dec. 29, 2020

(54) EXPANDED FUNCTIONALITY STOP-START FUEL SAVING SYSTEM FOR VOCATIONAL VEHICLES

(71) Applicant: Développement Effenco Inc., Montréal (CA)

(72) Inventors: Benoit Lacroix, Montréal (CA); David Arsenault, Montréal (CA); Dany Fouquet, Montréal (CA)

(73) Assignee: Développement Effenco Inc., Montréal (CA)

( * ) Notice: Subject to any disclaimer, the term of this patent is extended or adjusted under 35 U.S.C. 154(b) by 0 days.

(21) Appl. No.: 15/930,045

(22) Filed: May 12, 2020

(65) Prior Publication Data

US 2020/0276967 A1    Sep. 3, 2020

Related U.S. Application Data

(62) Division of application No. 15/998,653, filed as application No. PCT/CA2016/050712 on Jun. 17, 2016, now Pat. No. 10,703,356.

(Continued)

(51) Int. Cl.
*B60W 20/13* (2016.01)
*B60K 6/26* (2007.10)
(Continued)

(52) U.S. Cl.
CPC ............... *B60W 20/13* (2016.01); *B60K 6/12* (2013.01); *B60K 6/26* (2013.01); *B60K 6/28* (2013.01); *B60K 6/48* (2013.01); *B60W 10/06* (2013.01); *B60W 10/08* (2013.01); *B60W 10/11* (2013.01); *B60W 10/30* (2013.01); *B60W 50/00* (2013.01); *F02N 7/00* (2013.01); *F02N 11/0814* (2013.01); *F02N 11/0866* (2013.01); *F16H 61/0025* (2013.01); *B60K 2006/268* (2013.01); *B60W 2510/244* (2013.01); *B60W 2520/04* (2013.01); *B60W 2555/20* (2020.02);
(Continued)

(58) Field of Classification Search
CPC .......... B60W 20/13; B60K 6/12; B60K 6/26; B60K 6/28
See application file for complete search history.

(56) References Cited

U.S. PATENT DOCUMENTS 8,840,524 B2 * 9/2014 Arsenault ............. B60W 10/06
477/5

* cited by examiner

*Primary Examiner* — Derek D Knight
(74) *Attorney, Agent, or Firm* — Bereskin & Parr LLP

(57) ABSTRACT

An engine stop-start fuel saving system for a vocational vehicle propelled by a conventional internal combustion engine and powertrain. The system uses a low storage capacity, rapid recharge, high cycle life electric energy storage device, such as an ultracapacitor. The system also includes a generator that is coupled to the engine and that is connected to recharge the electric energy storage device, as well as a motor that is powered by the energy storage device and that is coupled to the engine. The system also includes a controller that can activate the motor to restart the engine when it is stopped, and engage the generator to recharge the electric energy storage device, and that can subsequently stop the engine again when the electric energy storage device has reached a threshold charge level. The electric energy storage device also powers at least one of: integral vehicle equipment; peripheral vehicle equipment; or an electrical outlet circuit with a socket for external plugin equipment.

20 Claims, 7 Drawing Sheets

Related U.S. Application Data

(60) Provisional application No. 62/295,702, filed on Feb. 16, 2016.

(51) Int. Cl.
    *B60K 6/28*     (2007.10)
    *B60K 6/48*     (2007.10)
    *B60W 10/06*     (2006.01)
    *B60W 10/08*     (2006.01)
    *B60W 10/11*     (2012.01)
    *B60W 10/30*     (2006.01)
    *F16H 61/00*     (2006.01)
    *B60W 50/00*     (2006.01)
    *F02N 11/08*     (2006.01)
    *B60K 6/12*     (2006.01)
    *F02N 7/00*     (2006.01)

(52) U.S. Cl.
    CPC . *B60W 2710/1083* (2013.01); *B60W 2710/30* (2013.01); *B60Y 2200/92* (2013.01); *F02N 2011/0885* (2013.01); *F02N 2200/061* (2013.01); *Y02T 10/40* (2013.01); *Y02T 10/7072* (2013.01); *Y02T 10/72* (2013.01)

EXPANDED FUNCTIONALITY STOP-START FUEL SAVING SYSTEM FOR VOCATIONAL VEHICLES

The present application is a divisional of U.S. patent application Ser. No. 15/998,653 filed on Aug. 16, 2018, that is a 35 USC 371 national stage entry of PCT/CA2016/050712 filed on Jun. 17, 2016, and which claims priority of U.S. provisional patent application No. 62/295,702, filed Feb. 16, 2016. These documents are hereby incorporated by reference in their entirety.

BACKGROUND

The present subject matter relates to stop-start fuel saving systems for vocational vehicles powered by a conventional internal combustion engine and powertrain.

In recent years, much effort has been expended by the automotive industry to develop automobiles with reduced fuel consumption and lower exhaust emissions. A variety of technologies have been explored, including regenerative braking, hybrid electric propulsion systems, and plug-in electric propulsion systems.

One technology that has recently been adopted by a number of automobile manufacturers is stop-start systems for vehicles having a conventional internal combustion engine and powertrain. Stop-start systems save fuel by shutting off the internal combustion engine when the vehicle has been braked to a stop, such as at a traffic light, and restarts the engine when the driver disengages the brake and steps on the accelerator. Stop-start systems reduce the amount of time that the engine is idling while the vehicle is stopped. They therefore reduce fuel consumption, reduce exhaust emissions, reduce engine wear, and reduce noise. Stop-start systems are relatively inexpensive compared to hybrid power systems or plug-in electric power systems.

Nevertheless, stop-start systems present a number of design challenges for vehicles having a conventional internal combustion engine and powertrain. For one thing, neither the battery nor the starter motor of a conventional vehicle would be able to handle the repeated stop-start cycles as would be experienced when driving in busy city traffic. In addition, redesign or modification of automatic transmissions is generally required to ensure adequate responsiveness when a stop-start system restarts the internal combustion engine.

Several different types of stop-start systems have been developed by manufacturers of consumer passenger vehicles. A summary of some of these is provided in the report by FEV GmbH entitled "In-Market Application of Stop-start Systems in European Market" (Markus Kremer), Dec. 6, 2011.

Notwithstanding the increasing adoption of stop-start systems for automobiles, there has so far been little deployment among vocational vehicles such as refuse collection trucks, bucket trucks, terminal tractors, dump trucks, cement mixer trucks, urban buses, and parcel delivery trucks. This may be considered surprising because, unlike most automobiles, many vocational vehicles are subject to frequent stops and re-starts as part of their regular duty cycle, even when there is no heavy traffic or dense distribution of traffic lights or stop signs. It is considered that there are at least three factors that have hindered the widespread adoption of stop-start systems for vocational vehicles.

For one thing, as mentioned above, developing a stop-start system involves a number of design challenges, requiring extensive development and testing; it may well be that the relatively small markets for specialized vocational vehicles has hindered the commitment of resources to develop stop-start systems for such vehicles.

Another factor pertains to the nature of the vocational vehicle industry. Automobile manufacturers typically develop, engineer and assemble the entire vehicle. By contrast, specialized vocational vehicles usually have several manufacturers: one or more manufacturers design and make the rolling chassis, which includes the frame and powertrain, while a different manufacturer designs and builds the body, which usually includes various specialized operating features and systems. Because of the lack of integration of the several manufacturing steps, it may be difficult to develop new technologies that involve design criteria affecting both the body and the rolling chassis.

A third aspect relates to the fact that the bodies of many vocational vehicles incorporate pieces of auxiliary equipment to execute a working function, such as the bin lifting arm of a garbage truck, the elevating boom of a bucket truck, the rotation of the drum on a cement mixer truck, and/or the bed lifter of a dump truck. Such equipment requires a mechanical drive, often to power a hydraulic pump, which is generally provided by the engine through a power take-off interface on the transmission or on a mechanical interface on the crankshaft of the engine. When the engine has been turned-off, the auxiliary equipment cannot be operated.

In some cases, it has been proposed to provide a battery pack on the vehicle to provide a secondary source of energy to drive auxiliary working equipment such as an electric motor to operate a hydraulic pump. The battery pack must be sized in a manner to get a sufficient amount of energy to supply the equipment for an entire day of operation of the vehicle, during the periods when the stop-start system has turned-off the engine. Typically, such a configuration requires a large battery that is recharged by being plugged-in to electric mains overnight; such a vehicle is commonly referred to as plug-in hybrid electric vehicle (PHEV).

The energy consumption of auxiliary systems on vocational vehicles can be very significant during the course of a typical work day. As an example, the compactor on a refuse truck requires at least 300 kJ per cycle of compaction, representing over 30 kWh per day. Moreover, to achieve any given amount of usable energy, a battery should have about twice the capacity to provide adequate battery life.

Assuming one full charge-discharge cycle per day, a vocational vehicle would require a battery with a minimum lifespan of at least 2500 cycles to meet an expected vehicle life of 10 years. The lifespan of lead acid batteries is well below this target. Although lithium-ion batteries can reach a lifespan of 2500 cycles, meeting the required energy capacity with lithium-ion batteries is currently expensive, and the batteries themselves add significant weight, which of course increases fuel consumption when the vehicle is being driven.

Vehicles with hybrid power systems generally incorporate a large lithium-ion battery pack, making it easier to incorporate a stop-start function with the capacity to power auxiliary equipment using the energy stored in the battery pack.

The present inventors' U.S. Pat. Nos. 8,840,524 and 9,132,824 describe several embodiments of a stop-start system that has recently gathered interest among operators of heavy duty vocational vehicles such as refuse trucks. The entire contents of U.S. Pat. Nos. 8,840,524 and 9,132,824 are hereby incorporated by reference.

One of the embodiments described therein relies on an electric energy storage device which can be used to: power an electric motor that drives a hydraulic pump to maintain hydraulic pressure in the automatic transmission when the engine has been turned off by the system; and power a restarting motor that restarts the engine while the transmission is in gear; and also power a motor to drive a pump to operate an auxiliary hydraulic system on the vehicle, such as the bin lifter of a refuse collection vehicle, while the engine has been turned off by the system.

While many stop-start systems use lithium-ion batteries, the present inventors have recognized that in certain applications, it is advantageous to rely on an electric energy storage device characterized by relatively low storage capacity, and with relatively rapid discharge-recharge times but high cycle life, compared to currently available lithium-ion batteries. Currently, Electric Double Layer Capacitors (aka EDLCs, or ultracapacitors, or super-capacitors), are available that meet these characteristics.

Suitable ultracapacitors selected for vocational vehicle stop-start systems may have an energy storage capacity between about 100 to 500 Wh, which should be sufficient to operate most auxiliary equipment during times when the internal combustion engine has been shut-off, and also to restart the engine. Such ultracapacitors should also have a high power capacity to allow powering of equipment rated at something in the order of 10 kW, and also allowing them to be recharged quickly, advantageously in less than one minute. Such ultracapacitors should also have a lifespan in excess of about 1 million cycles to remain operational for a vehicle life expectancy of 10 years. In addition, they should also be compatible with the environmental variables of the specific vocational vehicle, including operating temperature range, corrosion resistance and vibration resistance.

The present inventors have recognized that ultracapacitors with these characteristics can be very effective in stop-start systems deployed on refuse vehicles, as one example, given their high frequency of brief stops, and short travel times between stops. Unlike a lithium-ion battery or a nickel metal hydride battery, ultracapacitors can easily go through hundreds of discharge and recharge cycles in a day, while still being expected to maintain full functionality throughout the life of the vehicle.

Given that ultracapacitors can sustain charge-discharge cycles in excess of one million cycles, the energy storage capacity can be reduced to as low as the energy required to perform one operation cycle of the equipment of the vehicle plus the energy required to re-start the engine. The size of the energy storage can thus be reduced by a factor of up to at least one hundred compared to systems powered by lithium-ion batteries. Consequently, ultracapacitors allow the stop-start system to be smaller, lighter and less expensive than a system that relies on lithium-ion batteries.

While a stop-start system relying on ultracapacitors (or other relatively low energy capacity electric energy storage devices having relatively low storage capacity but rapid recharge times and long cycle life characteristics) has a number of advantages in certain vocational vehicle applications, particularly for vehicles having very frequent and short stops where auxiliary equipment is used, such as refuse vehicles, it has now been recognized by the inventors that such a stop-start system can provide additional functionalities.

SUMMARY

U.S. Pat. Nos. 8,840,524 and 9,132,824 disclose charging the energy storage device either by an external power source, or by a regenerative braking energy recovery system. However, the present inventors have now recognized that re-starting a vocational vehicle's engine when it is stopped to turn a generator to recharge an energy storage system utilizing ultracapacitors has many advantages in certain applications. In particular, the combination of an ultracapacitor electrical storage device with recharging the electrical storage device by re-starting the engine when it is stopped to turn a generator permits much greater flexibility in the power demand to be met by the system.

If a vocational vehicle has a stop-start system that uses a lithium-ion battery, the capacity of the battery must be optimized for the expected daily demand of the auxiliary equipment it must power while the engine is off. Using a significantly larger lithium-ion battery would add weight and cost. However, if a vocational vehicle has a stop-start system that uses ultracapacitors that can be recharged an almost limitless number of times by re-starting the internal combustion engine when it is stopped to turn a generator that recharges the ultracapacitors, many more functionalities can be included without increasing the storage capacity of the ultracapacitors.

The use of an electric energy storage device that uses ultracapacitors facilitates being able to power both integral equipment of a vocational vehicle and peripheral equipment added to a vocational vehicle, without needing to increase the energy storage capacity of the electric energy storage device. Similarly, a vocational vehicle can be employed in service for an extended period exceeding its usual duty cycle (for example, to accommodate an overtime shift) without needing to increase the energy storage capacity of the electric energy storage device. In fact, such a system can be employed even on vocational vehicles that are operated close to 24 hours per day, such as terminal tractors used to shunt trailers at cargo loading/unloading facilities.

In accordance with a first aspect of the present subject matter, there is provided an engine stop-start fuel saving system for a vocational vehicle propelled by a conventional internal combustion engine and powertrain, the system comprising:

a low storage capacity, rapid recharge, high cycle life electric energy storage device;

a motor that is powered by the energy storage device and that is coupled to the engine and;

a generator that is coupled to the engine and that is connected to recharge the electric energy storage device;

a controller that is responsive to one or more operating conditions to activate the motor that is coupled to the engine so as to restart the engine when it is stopped, and to engage the generator to recharge the electric energy storage device, and to subsequently stop the engine again when the electric energy storage device has reached a threshold level of charge;

wherein the electric energy storage device also powers at least one of:
  integral equipment of the vehicle;
  peripheral equipment included on the vehicle;
  an electrical outlet circuit with a socket for external plug-in electrical equipment.

In some examples, the electric energy storage device has a specified cycle life of at least one million cycles.

In some examples, the electric energy storage device has a specified storage capacity of between about 100 to 500 Wh.

In some examples, the electric energy storage device can be recharged in less than 2 minutes.

In some examples, the electric energy storage device has an energy density of 1 to 10 Wh/kg.

In some examples, the electric energy storage device has a power density of 1 to 10 kW/kg.

In some examples, the electric energy storage device is an ultracapacitor.

In some examples, the vehicle is equipped with a hydraulically activated automatic transmission, the system further comprising:

a) a transmission fluid pump able to supply pressurized transmission fluid to the automatic transmission;

b) a transmission fluid pump motor that is powered by the energy storage device and that is mechanically connected to the transmission fluid pump;

c) the controller being responsive to one or more operating conditions to turn off the engine when the vehicle is stopped and to use the transmission fluid pump motor to activate the transmission fluid pump to supply sufficient power to the transmission to maintain engagement of the transmission in a driving gear; and d) the controller also being responsive to one or more operating conditions to activate the motor that is coupled to the engine so as to restart the engine with the transmission engaged in the driving gear.

In some examples, the system comprises an auxiliary hydraulic system motor that is powered by the energy storage device and that is mechanically connected to a pump for an auxiliary hydraulic system of the vehicle, the controller also being responsive to one or more operating conditions to use the auxiliary hydraulic system motor to activate the pump for the auxiliary hydraulic system to supply pressurized hydraulic fluid to the auxiliary hydraulic system.

In some examples, the controller is responsive to one or more operating conditions to use the auxiliary hydraulic system motor to activate the pump for the auxiliary hydraulic system to supply pressurized hydraulic fluid to the auxiliary hydraulic system whether or not the engine is running.

In some examples, the auxiliary hydraulic system has no pump that is activated by a mechanical connection to the engine.

In some examples, the motor that is coupled to the engine is connected to the engine through one of a power take-off, a crankshaft and a flywheel and operable to selectively provide a starting torque to the internal combustion engine.

In some examples, the controller activates the motor that is coupled to the engine so as to restart the engine, and to engage the generator to recharge the electric energy storage device, when the electric energy storage device has expended about 60% of its maximum stored energy.

In some examples, after the controller has activated the motor that is coupled to the engine so as to restart the engine and engaged the generator to recharge the electric energy storage device, the controller subsequently stops the engine again when the electric energy storage device has reached about 55% to 70% of its maximum energy storage capacity.

In some examples, the system comprises peripheral equipment included on the vehicle and powered by the electric energy storage device.

In some examples, the peripheral equipment is one of a mobile meteorological station, a mobile telecommunication antenna, a system for evaluation of road conditions, a system for evaluation of traffic/congestion, a video surveillance system in closed circuit, and/or a data/image display.

In some examples, the system comprises an electrical outlet circuit with a socket for external plug-in electrical equipment powered by the electric energy storage device.

In some examples, the electrical outlet circuit has an inverter to deliver AC electrical power.

In some examples, the electrical outlet circuit has a DC-DC converter to deliver DC electrical power at a different voltage from that of the electric energy storage device.

In some examples, the system comprises integral equipment of the vehicle powered by the electric energy storage device.

In some examples, the integral equipment comprises a motor that is mechanically connected to a pump for an auxiliary hydraulic system of the vehicle.

In some examples, the integral equipment comprises a DC-DC converter to deliver DC electrical power at a different voltage from that of the electric energy storage device.

In some examples, the controller is responsive to very cold conditions to activate the motor that is coupled to the engine so as to restart the engine when the vehicle's conventional battery and starter may be unable to do so.

DRAWINGS

In order that the claimed subject matter may be more fully understood, reference will be made to the accompanying drawings, in which:

DESCRIPTION OF VARIOUS EMBODIMENTS

Figure 1:
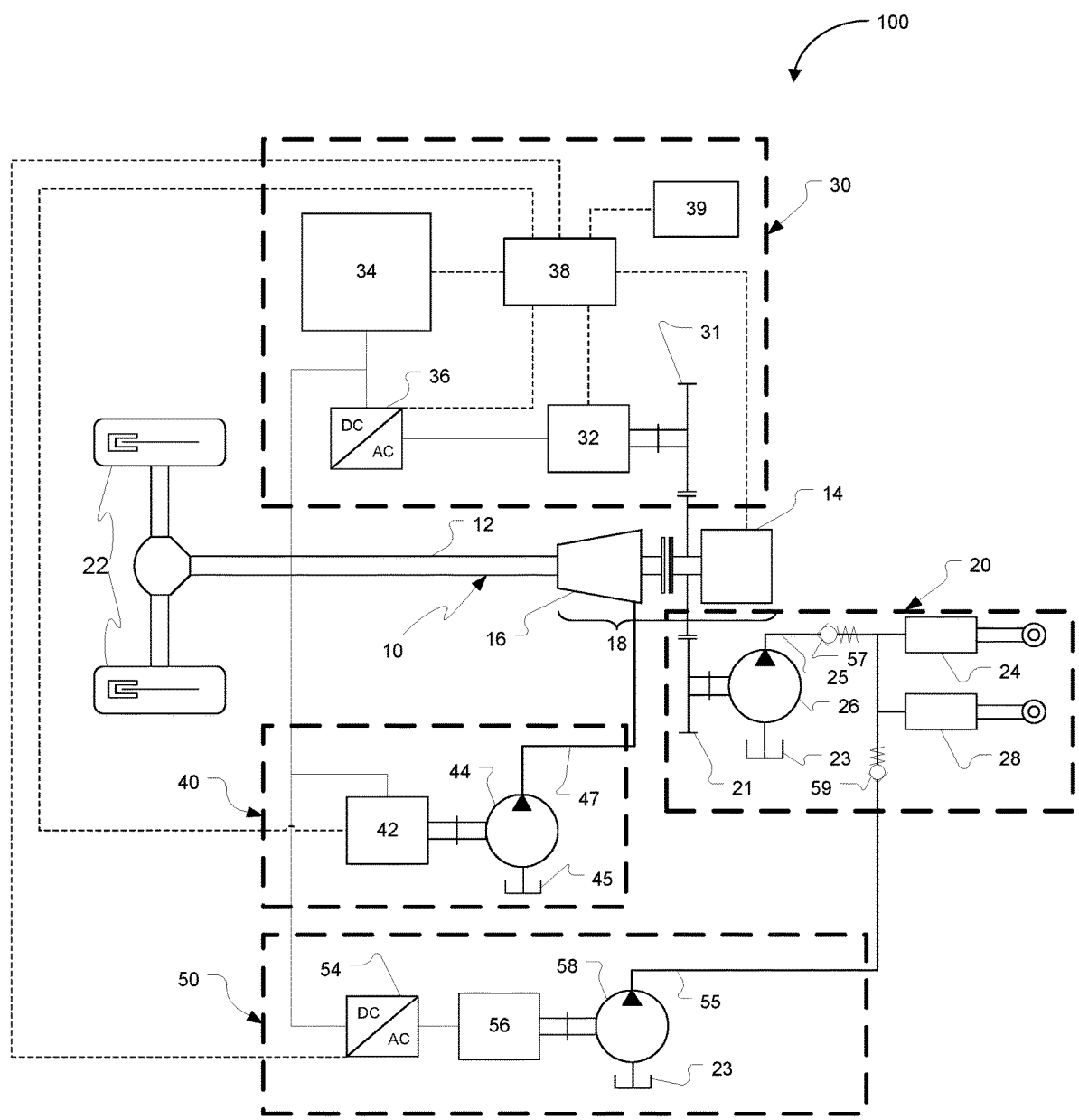
FIG. 1 is a schematic view of a stop-start fuel saving system in accordance with at least one embodiment.

It will be appreciated that, for simplicity and clarity of illustration, where considered appropriate, reference numerals may be repeated among the figures to indicate corresponding or analogous elements or steps. Numerous specific details are set forth in order to provide a thorough understanding of the exemplary embodiments of the subject matter described herein. However, it will be understood by those of ordinary skill in the art that the embodiments described herein may be practiced without these specific details. In other instances, well-known methods, procedures and components have not been described in detail so as not to obscure the present subject matter. Furthermore, this description is not to be considered as limiting the scope of the subject matter in any way but rather as illustrating the various embodiments.

As used herein, a "low storage capacity, rapid recharge, high cycle life electric energy storage device" means an electric energy storage device, such as an ultracapacitor, having a cycle life of at least 100,000 to at least one million cycles, and an energy storage capacity of less than about 500 Wh and being able to recharge from about 40% to about 100% of maximum energy storage capacity with a power supply of 5-10 kW in less than a few minutes.

As used herein, "integral equipment" of a vocational vehicle means components and/or systems that are conventionally included on the vehicle and powered by the engine, or the battery, such as lights, electric fans, a radio, the air conditioning compressor, the power steering fluid pump, an air brake system, an engine coolant pump, and/or a fuel pump.

As used herein, "peripheral equipment" for a vocational vehicle means components and/or systems that are not conventionally included on the vehicle, and that provide complementary functions that may be unrelated to the primary function of the vehicle, such as, for example on a refuse truck, an added mobile meteorological station, mobile telecommunication antenna, system for evaluation of road conditions, system for evaluation of traffic/congestion, video surveillance system in closed circuit, and/or data/image display (e.g. for either advertisements or public messages).

In addition, as used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof.

FIG. 1 schematically depicts a fuel saving system 100, which comprises a stop-start system 30 installed on a powertrain 10 of a vocational vehicle, in accordance with at least one embodiment.

The powertrain 10 may comprise an internal combustion engine (ICE) 14 and a transmission 16, together forming an engine-transmission assembly 18, and a driveshaft 12 connecting a wheel set 22 to the transmission 16.

The engine 14 may be, for example, a diesel engine having an independent source of energy and a rated power sufficient to move the vehicle, typically ranging from 150 kW to 325 kW. The engine 14 can also be any other internal combustion engine such as gasoline engine, natural gas engine, propane engine, ethanol engine, biodiesel engine, biobutanol engine, dimethyl ether engine, methanol or any renewable hydrocarbon biofuel engine.

In at least one embodiment, the stop-start system 30 may comprise an electric energy storage device 34, at least one electrical motor-generator 32 (powered by the electric energy storage device 34), configured to perform high frequency engine startups and an electronic control module 38. Optionally, the stop-start system 30 may comprise a remote communication device 39 connected to the electronic control module 38.

The electric energy storage device 34 may provide its stored energy through an electrical connection to the electrical motor-generator 32. A DC/AC electric motor controller 36 can be used to manage the energy flow between the electric energy storage device 34 and the electrical motor-generator 32. The electrical motor-generator 32 is mechanically connected to the engine 14 through a mechanical interface 31. The mechanical interface 31 may be a power take-off on the transmission 16 or on the engine 14, or it may be a direct mechanical connection with the crankshaft of the engine 14. Optionally, the electrical motor-generator 32 may be positioned between the engine 14 and the transmission 16.

The electric energy storage device 34 may also be charged by an external source of electrical power through an electrical connection and/or by an electrical braking energy recovery system and/or by the engine 14.

The electric energy storage device 34 is a low energy storage device, which may be charged and discharged frequently, without substantially diminishing the lifetime expectancy of the electric energy storage device 34. According to an exemplary embodiment, the electric energy storage device 34 has an energy storage capacity of 160 Wh, a rated voltage of 144V and has a duty cycle of at least one million cycles.

Advantageously, the electric energy storage device 34 is an ultracapacitor.

(According to another exemplary embodiment, the electric energy storage device 34 has an energy storage capacity of 92 Wh, a rated voltage of 57 V and has a duty cycle of two million cycles at 400 A. The electric energy storage device 34 can be a hybrid ultracapacitor, which combines characteristics of lithium-ion battery (e.g. high energy storage capacity) with characteristics of an ultracapacitor (e.g. capacity to sustain charge-discharge cycles in excess of one million cycle and small size/dimensions) as described herein.)

For example, the frequency of charge/discharge of the electric energy storage device 34 may be about 15 seconds to about 30 minutes. The time of charging may be as short as about 5 seconds to about 2 or 3 minutes. The time of discharging of the electric energy storage device 34 may be 5 seconds to about 30 minutes. The lifetime of such electric energy storage device 34 may be, for example, at least about 10 years, with at least about one million cycles per lifetime. It should be noted that a cycle of charge/discharge may not always be done over the full range of operating voltage, but may likely be done over a narrower range of voltage. For example, an ultracapacitor with a rated voltage of 144V could be recharged as soon as it reaches 140V.

The system 30 could operate with the electric energy storage device 34 having any suitable energy storage capacity, if the electric energy storage device 34 can charge/discharge quickly without affecting its lifetime. In at least one embodiment, the system 30 may operate with the electric energy storage device 34 having energy storage capacity of about 100 Wh to about 1 kWh. The system 30 may operate with the electric energy storage device 34 having power capacity of about 10 kW to about 30 kW without affecting significantly its lifetime.

Suitable ultracapacitors for the present application are available from Maxwell Technologies, Inc. In one configuration, three modules each having a rated voltage of 48V and a rated stored energy of 53 Wh are combined.

As will be known to those skilled in the art, ultracapacitors can suffer from leakage at elevated temperatures, leading to irreversible loss of capacitance. Accordingly, the system advantageously includes a discharger to reduce the voltage when the vehicle will be parked for an extended period in an elevated temperature environment. (The discharger can also be used to reduce the voltage for maintenance.) Advantageously, the system also includes a recharger powered by the vehicle's conventional battery to restore the charge of the ultracapacitor backup to the threshold level at which the generator mechanically coupled to the engine can recharge the ultracapacitor.

In at least one embodiment, the engine 14 may be used to recharge the energy storage device 34. In at least one embodiment, the energy storage device 34 may be charged through recovering the kinetic energy of braking and/or using an external source of energy with photovoltaic panels, for example. The powertrain 10 may be equipped with a braking energy recovery system. In particular, the motor-generator 32 may be configured to recover some braking energy through the transmission 16.

The stop-start system 30 may also include a communication device 39, such as, for example, an embedded computer, a data recorder, and/or a Global System for Mobile Communication (GSMC) module, to transfer information collected on the vocational vehicle to an external data collecting center. The communication device 39 may be used to monitor the operation of the vocational vehicle (for example, fuel usage, distance traveled, GPS position, or maintenance alarms), monitor the operation of the stop-start system (for example, total engine time saved, engine fuel rate or operating time), or transmit real time data collected by equipment mounted on the vehicle (for example, a mobile meteorological station, or a traffic/congestion monitor, or video surveillance system).

The electronic control module 38 controls the operation of the stop-start system, in response to various signals from the vehicle or from the operator. In at least one embodiment, the electronic control module 38 shuts-off the engine 14 when the vehicle is immobile with the parking brake applied or service brake depressed or work brake activated. The electronic control module 38 may also monitor the gear selected in the transmission 16. Under certain conditions such as low engine temperature, low battery voltage, anti-locking braking system event or low air brake pressure, the system can prevent the engine 14 to shut-off. The electronic control module 38 will automatically restart the engine 14 from the stop mode if none of the parking brake, the service brake, nor the work brake is activated.

The electronic control module 38 also controls the management of the state of charge of the energy storage device 34. When the state of charge of the energy storage device 34 is below a low threshold level, the electronic control module 38 will operate the electrical motor-generator 32 in generator mode to recharge the energy storage device 34 up to a high threshold level.

The stop-start system may be installed on vocational vehicles such as refuse trucks or cement trucks. Such vocational vehicles may further comprise at least one auxiliary hydraulic system 24, which may be any hydraulically powered piece of equipment, such as garbage compactor, hydraulic arm to lift a garbage can, rotary cement mixer or other hydraulically powered equipment.

When the engine 14 is turned off, no power from the engine 14 is provided to the transmission 16. Consequently, if the transmission 16 is of the automatic type, there may be a lack of hydraulic pressure and the transmission cannot be maintained in a driving gear (for example first gear). Instead the transmission will fall into a "neutral gear". After restarting the engine 14, the hydraulic pressure in the transmission 16 would have to be built up before there would be sufficient energy for the transmission to change from neutral to a driving gear. The time required for the hydraulic pressure to build up and shift to the driving gear is typically several seconds. Consequently an operator of the vehicle will feel a lag between restarting the vehicle and when the vehicle actually starts accelerating after its transmission has selected a driving gear. In a typical operation where the operator starts the vehicle using an electrical ignition system while the vehicle is completely stationary, this lag is acceptable. However, in a situation where the operator is used to the engine 14 idling when the vocational vehicle is stopped, and further expects the vocational vehicle to immediately accelerate following the operators command (for example stepping on the gas pedal), this lag may be frustrating or even dangerous. For example, in a situation where the vocational vehicle is on an uphill incline, having a lag between the time when an operator gives a command to accelerate and the actual time the vocational vehicle starts accelerating can cause the vehicle to roll backwards down the incline for several seconds before being able to stop and accelerate forward.

The fuel saving system of FIG. 1 may also include an electric/hydraulic transmission assembly 40. The electric/hydraulic transmission assembly 40 is used to prevent the transmission 16 from falling out of a driving gear into a neutral gear. However, in a low duty cycle operation such as a bucket truck, the assembly is not required because the vehicle is parked with the transmission in neutral to perform the work on the site.

The electric/hydraulic transmission assembly 40 may comprise an electrical motor 42 and a fixed displacement hydraulic pump 44. The hydraulic pump 44 may be powered by the electrical motor 42. When the engine 14 is turned off, the fixed displacement hydraulic pump 44 may provide pressure through a hydraulic circuit to the transmission 16 to maintain it in a first gear.

After starting the engine 14 using the electrical motor-generator 32, the transmission 16 will still be in a driving gear and no lag will be felt by the vehicle operator when a command to accelerate the vocational vehicle is given. It will be appreciated that the level of power needed to maintain the transmission in gear is substantially lower than the power needed to idle the engine 14 for even a short period of time. Therefore turning off the engine 14 and using the electric energy from the stop-start system 30 to engage the fixed displacement hydraulic pump 44 to maintain the transmission in a driving gear can provide a significant saving in fuel consumption.

The vocational vehicle can also have an auxiliary hydraulic assembly 20 with an electric/hydraulic assembly 50. The auxiliary hydraulic assembly 20 may comprise at least one auxiliary hydraulic system. The auxiliary hydraulic systems, such as a first auxiliary hydraulic system 24 and/or a second auxiliary hydraulic system 28 shown at FIG. 1, are often provided on vocational vehicles such as refuse trucks or cement trucks, on which the fuel saving system 100 may be installed.

The auxiliary hydraulic systems may be any hydraulically powered piece of equipment, such as a garbage compactor, a hydraulic arm to lift a garbage can, a rotary cement mixer, an overhead boom for a bucket truck, a hydraulic fifth wheel boom for a yard truck or other hydraulically powered equipment.

As shown at FIG. 1, the first auxiliary hydraulic system 24 and the second auxiliary hydraulic system 28 may be connected through a hydraulic connection line 25 to an auxiliary hydraulic pump 26. When the engine 14 is on, the auxiliary hydraulic pump 26 may drive the first auxiliary hydraulic system 24 and the second auxiliary hydraulic system 28. In at least one embodiment, when the engine 14 is off (in Stop mode), in order to maintain the operation of the auxiliary hydraulic equipment of the assembly 20 an electric/hydraulic assembly 50 can be used. In at least one embodiment, the electric/hydraulic assembly 50 comprises an electric DC/AC drive (inverter) 54, an electrical motor 56, and a hydraulic pump 58. In at least one embodiment, the first auxiliary hydraulic system 24 and the second auxiliary hydraulic system 28 can be fed by the auxiliary hydraulic pump 26 driven by the engine 14 and/or by an electric/hydraulic assembly 50 by using the energy stored in energy storage device 34. For example, the electric/hydraulic assembly 50 can provide pressure through the hydraulic connection line 55 to the auxiliary equipment when the engine 14 is off. To prevent the auxiliary hydraulic pump 26 from turning in a reverse rotation when the engine 14 is shut-off and the hydraulic pump 58 is turning, a non-return valve 57 is positioned on the hydraulic connection line 25. Similarly, to prevent the hydraulic pump 58 from turning in a reverse rotation when the engine 14 is running, a non-return valve 59 is positioned on the hydraulic connection line 55.

The electronic control module 38 controls the operation of the electric/hydraulic assembly 50. The electronic control module 38 activates the electrical motor 56 when there is a demand (a lever, a joystick, or push button activated by the operator) to operate the first auxiliary hydraulic system 24 and/or the second auxiliary hydraulic system 28 by providing a hydraulic fluid flow from the hydraulic pump 58 equivalent to the flow provided by auxiliary hydraulic pump 26. The electronic control module 38 is also configured to respond to increased hydraulic fluid flow demand from a high idle governor command by increasing proportionally the control speed of the electrical motor 56 driving the hydraulic pump 58. Driving the auxiliary hydraulic systems of the assembly 20 using the electric/hydraulic assembly 50 can avoid losses of energy related to continuous driving of the auxiliary hydraulic pump 26.

Figure 2:
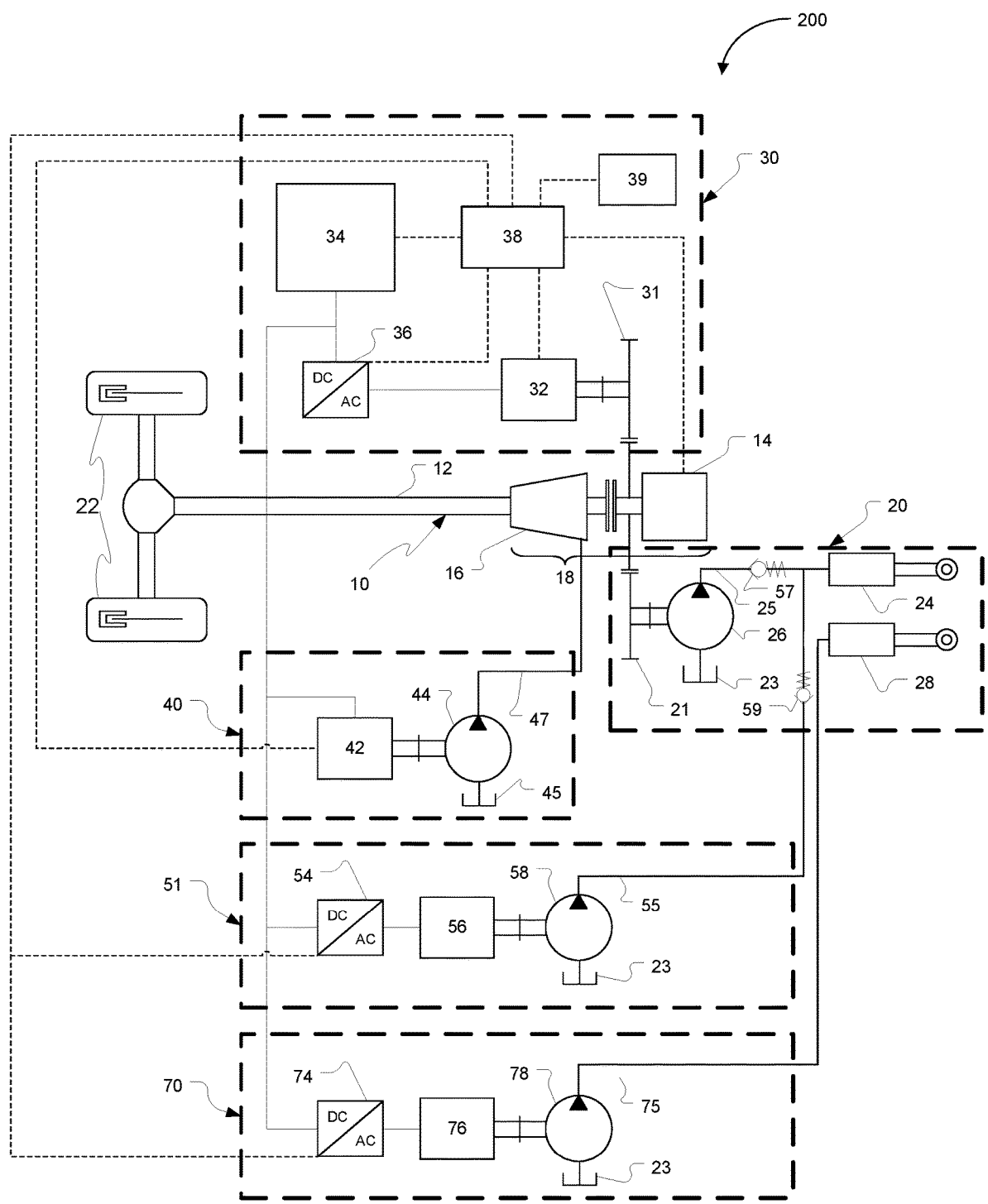
FIG. 2 is a schematic view of a stop-start fuel saving system in accordance with another embodiment.

Referring now to FIG. 2, shown therein is an exemplary embodiment of a system 200 with two electric/hydraulic assemblies 51 and 70, which can drive the auxiliary hydraulic systems 24 and 28 independently and/or on demand.

In at least one embodiment, the electric/hydraulic assemblies 51 and 70 have the same components as the electric/hydraulic assembly 50 as described above. When the engine 14 is turned off by the stop-start system, the electric/hydraulic assembly 70 can independently provide a pressure to auxiliary hydraulic system 28 on request, while the electric/hydraulic assembly 51 can independently provide a pressure to auxiliary hydraulic system 24 on request. Therefore, the auxiliary systems of the fuel saving system 200 can be activated on demand, thereby helping to reduce energy losses generated by rotating the auxiliary hydraulic pump 26 in a by-pass valve when there is no demand from auxiliary hydraulic systems 24 and 28. Additionally, electric/hydraulic assemblies 51 and 70 can provide an independent variable hydraulic flow by controlling the speed of rotation of the electrical motor 56 and 76. This gives more flexibility on the control of the auxiliary hydraulic systems 24 and 28 compared to the auxiliary hydraulic pump 26, which is limited to the speed of rotation of the engine 14. Therefore, the auxiliary systems of the fuel saving system 200 can be controlled more precisely, and independently from the engine 14, thereby helping to reduce energy losses.

The system 200 may comprise more than two electric/hydraulic assemblies, to supply, for example, more than two auxiliary hydraulic systems independently.

Figure 3:
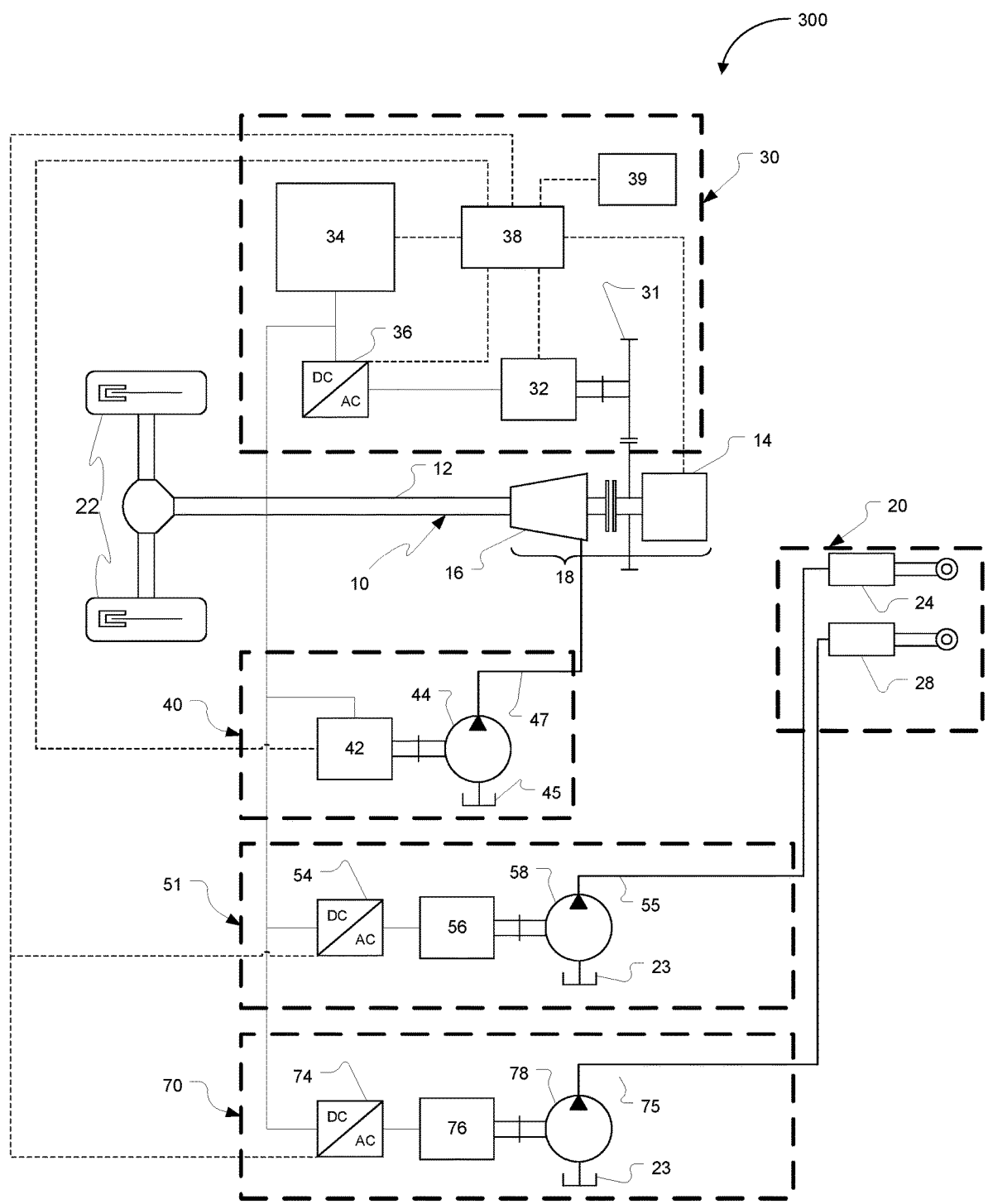
FIG. 3 is a schematic view of a stop-start fuel saving system in accordance with another embodiment.

Shown at FIG. 3 is a variation of the exemplary embodiment shown in FIG. 2 wherein the auxiliary system hydraulic pump 26 is absent. Instead, hydraulic pressure and flow to the auxiliary hydraulic systems 24 and 28 is provided by the electric/hydraulic assemblies 51 and/or 70 regardless of whether the engine 14 is running or has been turned-off. An advantage of such a configuration is that it would eliminate parasitic losses related to rotating the pump 26 when the hydraulic assemblies 51, 70 are not activated. In addition, such a configuration would allow for a more precise and flexible control of each of the hydraulic circuits 24, 28, for example by reducing the hydraulic flow as a piston reaches either end of its maximum stroke to lower shock and wear of components.

Figure 4:
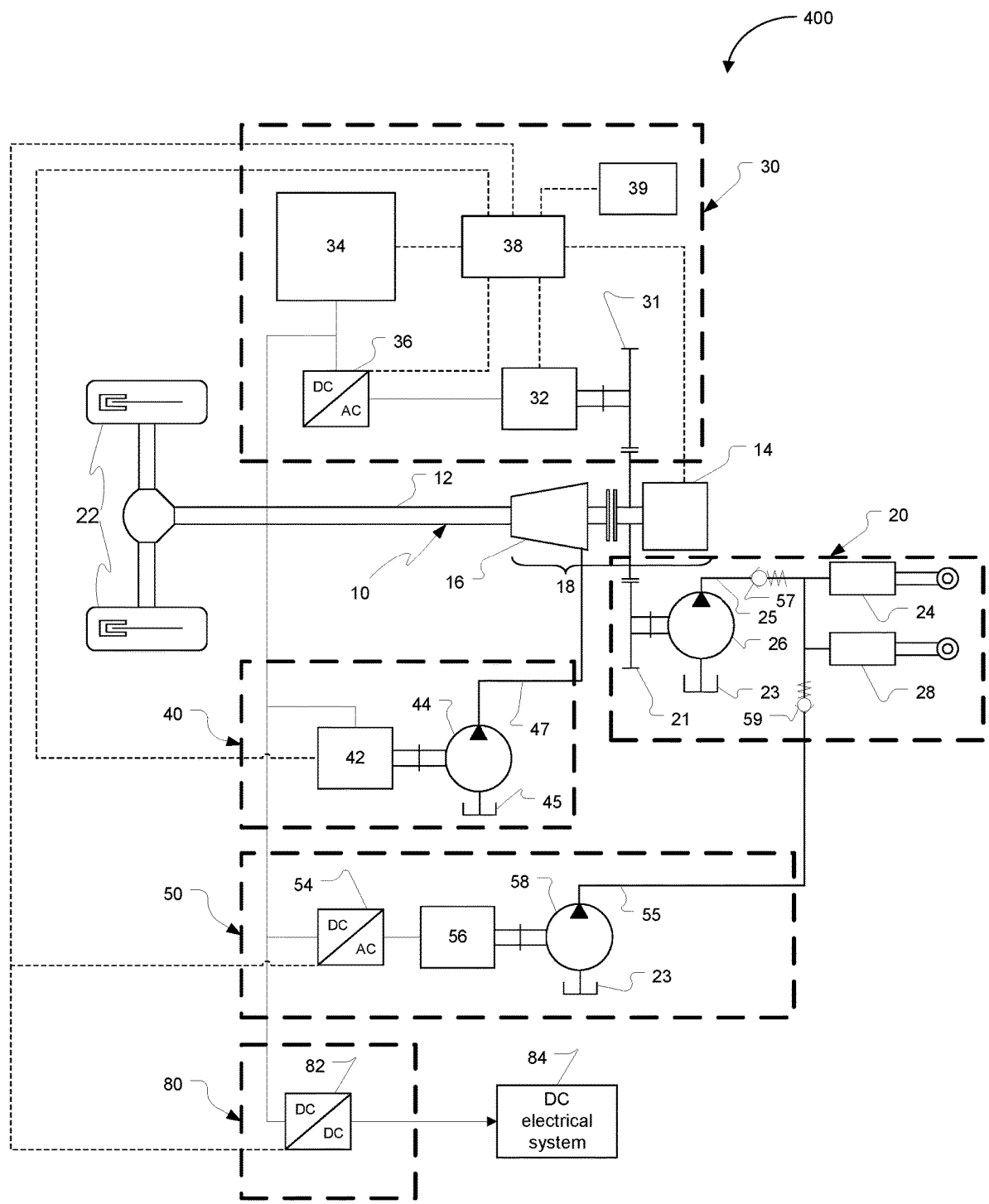
FIG. 4 is a schematic view of a stop-start fuel saving system in accordance with another embodiment.

Shown at FIG. 4 is an exemplary embodiment of a fuel saving system 400 which comprises, in addition to the stop-start system 30 and optional assemblies 40, 20, and 50, as described herein, a DC outlet assembly 80.

The DC outlet assembly 80 can be connected to a DC electrical system 84. A DC-DC converter 82 converts the voltage from the energy storage device 34 to the voltage required to supply the DC electrical system 84. For example, the DC-DC converter 82 may recharge the 12V or 24V batteries of the vocational vehicle. In another example, the DC outlet assembly 80 can be used to provide DC electrical power to an electrical motor actuating the vehicle's internal air conditioner compressor.

A vocational vehicle equipped with stop-start system 30 further enables it to be used as a source of portable energy, similar to an engine-generator set. The nature of vocational vehicles, being often grouped into large fleets and usually operating in urban areas, offers the opportunity to transform them into emergency response equipment capable of being deployed rapidly in the case of a major power outage.

Figure 5:
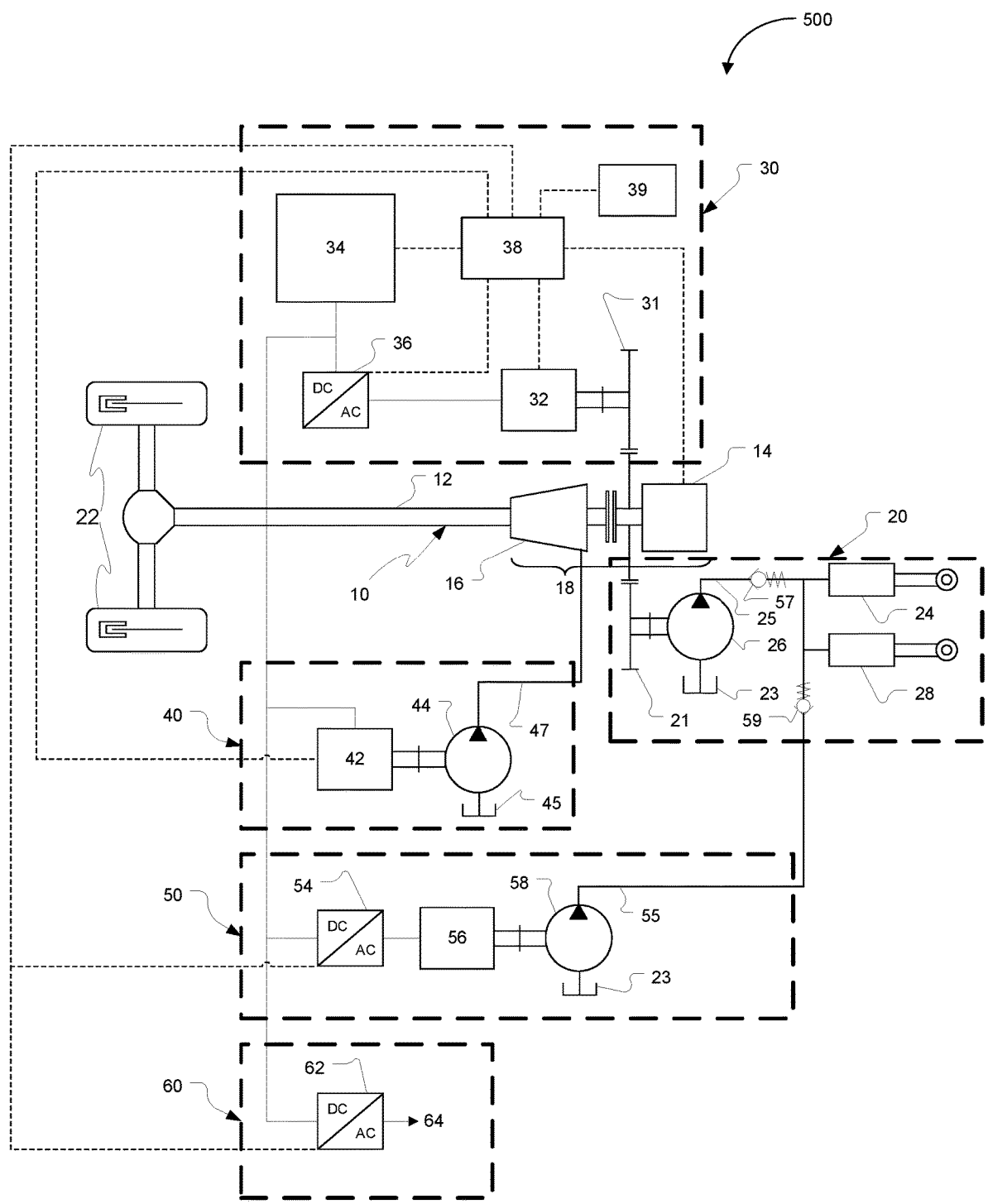
FIG. 5 is a schematic view of a stop-start fuel saving system in accordance with another embodiment.

Referring now to FIG. 5, shown therein is an exemplary embodiment of a fuel saving system 500 which comprises, in addition to the stop-start system 30 and optional assemblies 40, 20 and 50 as described herein, an AC outlet assembly 60.

The outlet assembly 60 can be used to provide electrical power with a standard voltage of 110 Volts or 220 Volts for a tool and/or equipment used in connection with the operation of the vocational vehicle. The outlet assembly 60 advantageously provides an output of 110 V at 60 Hz. The tool and/or equipment may be mounted on the vehicle or may be connected to the vehicle externally.

Figure 6:
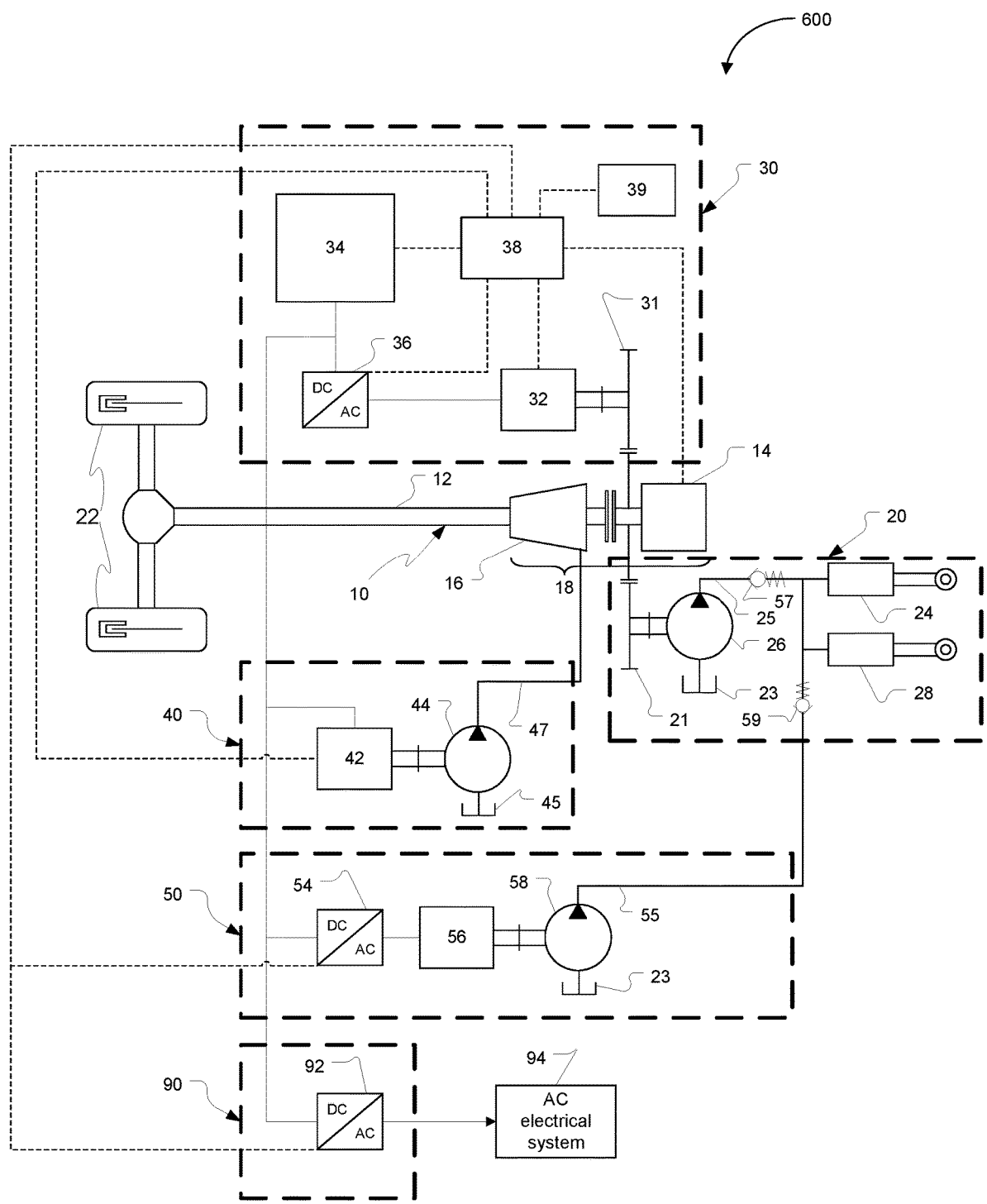
FIG. 6 is a schematic view of a stop-start fuel saving system in accordance with another embodiment.

Shown at FIG. 6 is an exemplary embodiment of a fuel saving system 600 which comprises, in addition to the stop-start system 30 and optional assemblies 40, 20, and 50, as described herein, an assembly 90 that may be connected to an external electrical system of the vehicle. The assembly 90 may include a DC/AC drive 92 to convert the DC voltage from the energy storage device 34 to an AC output for the external electrical system 94.

Another characteristic of vocational vehicles is that they usually cover streets on a regular basis. For example, a fleet of refuse trucks or street sweepers will drive through all the streets on a repetitive route and schedule, making them useful platforms to monitor a variety of parameters in a city, such as traffic flow and parking density.

Figure 7:
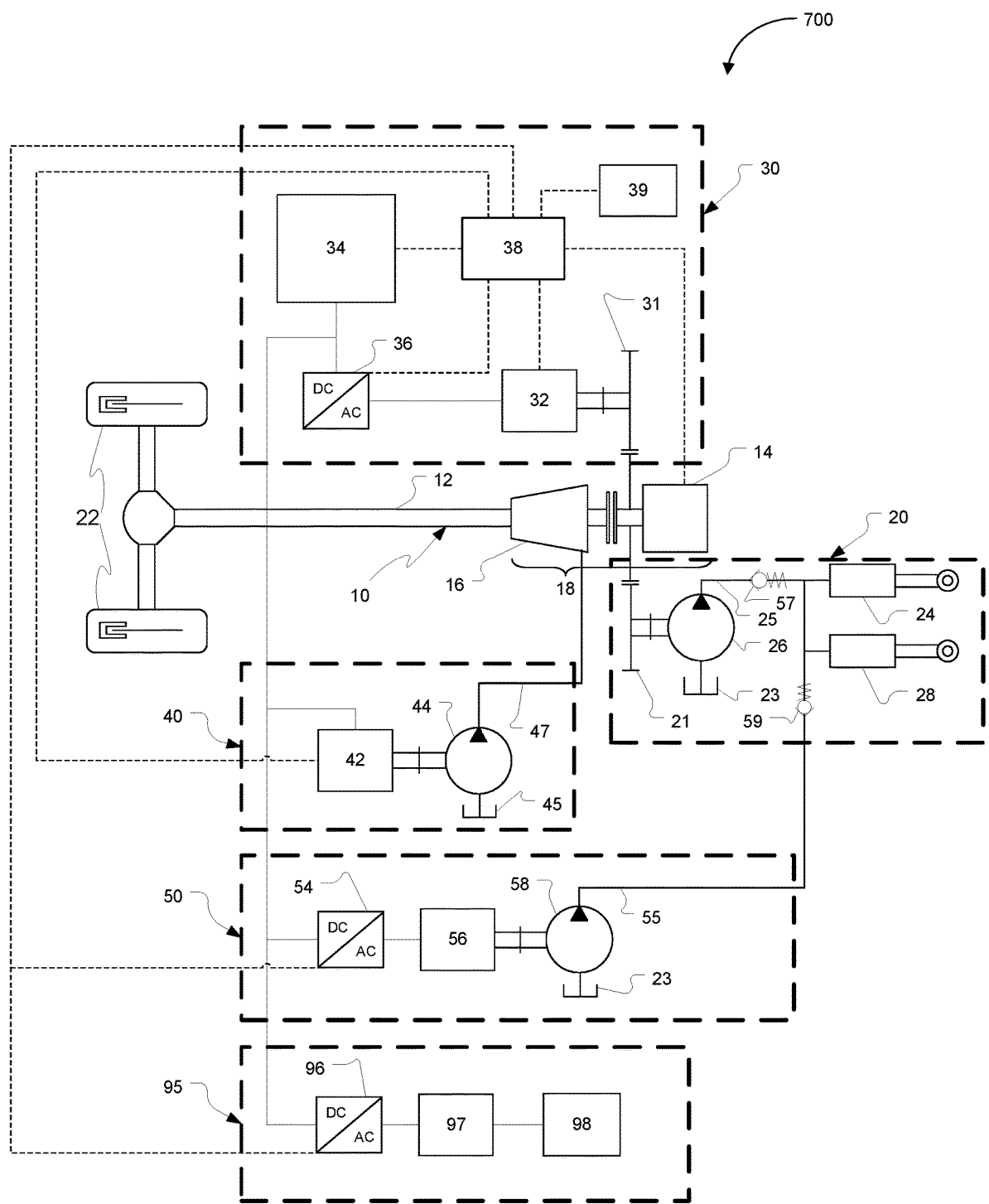
FIG. 7 is a schematic view of a stop-start fuel saving system in accordance with another embodiment.

Shown at FIG. 7 is an exemplary embodiment of a fuel saving system 700 which comprises, in addition to the start-stop system 30 and optional assemblies 40, 20, and 50, as described herein, an equipment assembly 95 that can drive a piece of integral equipment 98 of the vehicle. The equipment assembly 95 may include a DC/AC electric motor controller 96 to convert the DC voltage from the energy storage device 34 to an AC output for powering integral equipment 98 of the vehicle (for example by means of an electric motor 97). The integral equipment 98 may be integral equipment that is usually powered by the engine 14. For example, the integral equipment may be a power steering pump, a compressor for air conditioning system, a compressor for an air brake system, an engine coolant pump, a fuel pump or other integral equipment (including an optional accessory) normally driven by the engine 14. The integral equipment assembly 95 can be installed in parallel to the original equipment. The electronic control module 38 controls the operation of the equipment assembly 95. The electronic control module 38 is configured to detect a demand to operate the original equipment when the engine is in stop mode to drive equipment assembly 95 from the energy stored in the energy storage device 34.

The integral equipment 98 can also replace the original equipment. In this case, the electronic control module 38 is configured to detect a demand to operate the original equipment independently of the engine mode to drive equipment assembly 95 from the energy stored in the energy storage device 34. It is advantageous to drive the integral equipment 98 on demand with the integral equipment 98 disconnected from the rotation of the engine 14, therefore reducing energy losses.

The fuel saving system 700 could incorporate a plurality of equipment assembly 95 to drive independently a multitude of integral equipment 98.

The fuel saving systems as described herein may be useful on working vocational vehicles, for example, for non-typical use of the vehicles. For example, a refuse truck may serve as an emergency mobile generator. The generated energy may be also used for powering a mobile meteorological station, a mobile telecommunication antenna, a system for evaluation of road conditions, a system for evaluation of traffic/congestion, a video surveillance system in closed circuit, or a data/image display (e.g. advertisements or public messages). Additionally, the fuel saving system could take advantage of a remote communication device 39 to transfer the information collected on the vocational vehicle to an external data collecting center.

The fuel saving systems as described herein may also be adapted to restart the engine in situations where the vehicle has been left stopped in very cold conditions, and the vehicle's conventional battery and starter are inadequate to restart the engine.

It will be appreciated by those skilled in the art that although the above alternative embodiments have been described in some detail many modifications may be practiced without departing from the claimed subject matter.

The invention claimed is:

1. An engine stop-start fuel saving system for a vocational vehicle propelled by a conventional internal combustion engine and powertrain, the system comprising:
 a) a low storage capacity, rapid recharge, high cycle life electric energy storage device;
 b) a motor that is powered by the energy storage device and that is coupled to the engine and;
 c) a generator that is coupled to the engine and that is connected to recharge the electric energy storage device;
 d) a controller that is responsive to one or more operating conditions to activate the motor that is coupled to the engine so as to restart the engine when it is stopped, and to engage the generator to recharge the electric energy storage device, and to subsequently stop the engine again when the electric energy storage device has reached a threshold level of charge;
 e) wherein the controller is configured to detect a demand to operate equipment when the engine is stopped, and wherein, when said demand is detected, the controller engages the electric energy storage device to power at least one of:
  i) integral equipment of the vehicle;
  ii) peripheral equipment included on the vehicle; and
  iii) an electrical outlet circuit with a socket for external plug-in electrical equipment.

2. The system of claim 1, wherein the electric energy storage device has a specified cycle life of at least one million cycles.

3. The system of claim 1, wherein the electric energy storage device has a specified storage capacity of between about 100 to 500 Wh.

4. The system of claim 1, wherein the electric energy storage device can be recharged in less than 2 minutes.

5. The system of claim 1, wherein the electric energy storage device has an energy density of 1 to 10 Wh/kg.

6. The system of claim 1, wherein the electric energy storage device has a power density of 1 to 10 kW/kg.

7. The system of claim 1, wherein the electric energy storage device is an ultracapacitor.

8. The system of claim 1, wherein the vehicle is equipped with a hydraulically activated automatic transmission, the system further comprising:
 a) a transmission fluid pump able to supply pressurized transmission fluid to the automatic transmission;
 b) a transmission fluid pump motor that is powered by the energy storage device and that is mechanically connected to the transmission fluid pump;
 c) the controller being responsive to one or more operating conditions to turn off the engine when the vehicle is stopped and to use the transmission fluid pump motor to activate the transmission fluid pump to supply sufficient power to the transmission to maintain engagement of the transmission in a driving gear; and
 d) the controller also being responsive to one or more operating conditions to activate the motor that is coupled to the engine so as to restart the engine with the transmission engaged in the driving gear.

9. The system of claim 1, further comprising an auxiliary hydraulic system motor that is powered by the energy storage device and that is mechanically connected to a pump for an auxiliary hydraulic system of the vehicle, the controller also being responsive to one or more operating conditions to use the auxiliary hydraulic system motor to activate the pump for the auxiliary hydraulic system to supply pressurized hydraulic fluid to the auxiliary hydraulic system.

10. The system of claim 9, wherein the controller is responsive to one or more operating conditions to use the auxiliary hydraulic system motor to activate the pump for the auxiliary hydraulic system to supply pressurized hydraulic fluid to the auxiliary hydraulic system whether or not the engine is running.

11. The system of claim 10, wherein the auxiliary hydraulic system has no pump that is activated by a mechanical connection to the engine.

12. The fuel saving system of claim 1, wherein the motor that is coupled to the engine is connected to the engine through one of a power take-off, a crankshaft and a flywheel and operable to selectively provide a starting torque to the internal combustion engine.

13. The system of claim 1, wherein the controller activates the motor that is coupled to the engine so as to restart the engine, and to engage the generator to recharge the electric energy storage device, when the electric energy storage device has expended about 60% of its maximum stored energy.

14. The system of claim 1, wherein after the controller has activated the motor that is coupled to the engine so as to restart the engine and engaged the generator to recharge the electric energy storage device, the controller subsequently stops the engine again when the electric energy storage device has reached about 55% to 70% of its maximum energy storage capacity.

15. The system of claim 1, comprising peripheral equipment included on the vehicle and powered by the electric energy storage device, wherein the peripheral equipment is one of a mobile meteorological station, a mobile telecommunication antenna, a system for evaluation of road conditions, a system for evaluation of traffic/congestion, a video surveillance system in closed circuit, and/or a data/image display.

16. The system of claim 1, further comprising an electrical outlet circuit with a socket for external plug-in electrical equipment powered by the electric energy storage device, wherein the electrical outlet circuit has an inverter to deliver AC electrical power.

17. The system of claim 16, wherein the electrical outlet circuit has a DC-DC converter to deliver DC electrical power at a different voltage from that of the electric energy storage device.

18. The system of claim 1, further comprising integral equipment of the vehicle powered by the electric energy storage device, wherein the integral equipment comprises a motor that is mechanically connected to a pump for an auxiliary hydraulic system of the vehicle.

19. The system of claim 18, wherein the integral equipment comprises a DC-DC converter to deliver DC electrical power at a different voltage from that of the electric energy storage device.

20. The system of claim 1, wherein the controller is responsive to activate the motor that is coupled to the engine so as to restart the engine when the vehicle's conventional battery and starter may be unable to do so.

* * * * *